US012624676B2

(12) United States Patent
Nicolas et al.

(10) Patent No.: US 12,624,676 B2
(45) Date of Patent: May 12, 2026

(54) BUCKET OF A PELTON TURBINE

(71) Applicant: ANDRITZ HYDRO GmbH, Vienna (AT)

(72) Inventors: Gervais Nicolas, Les Longevilles (FR); Loic Andolfatto, Lausanne (CH)

(73) Assignee: ANDRITZ HYDRO GmbH, Vienna (AT)

( * ) Notice: Subject to any disclaimer, the term of this patent is extended or adjusted under 35 U.S.C. 154(b) by 0 days.

(21) Appl. No.: 18/872,464

(22) PCT Filed: Mar. 20, 2023

(86) PCT No.: PCT/AT2023/060078

§ 371 (c)(1),
(2) Date: Dec. 6, 2024

(87) PCT Pub. No.: WO2023/235905

PCT Pub. Date: Dec. 14, 2023

(65) Prior Publication Data

US 2025/0354534 A1 Nov. 20, 2025

(30) Foreign Application Priority Data

Jun. 7, 2022 (AT) .............................. A 50396/2022

(51) Int. Cl.
*F03B 1/02* (2006.01)

(52) U.S. Cl.
CPC ............ *F03B 1/02* (2013.01); *F05B 2240/30* (2013.01)

(58) Field of Classification Search
CPC ........................... F03B 1/02; F05B 2240/2411
See application file for complete search history.

(56) References Cited

U.S. PATENT DOCUMENTS

| | | | | |
|---|---|---|---|---|
| 6,443,697 | B1 * | 9/2002 | Rossi | F01D 5/34 415/202 |
| 10,550,821 | B2 * | 2/2020 | Loetscher | F03B 1/02 |
| 2004/0120821 | A1 | 6/2004 | Geppert et al. | |

FOREIGN PATENT DOCUMENTS

| | | |
|---|---|---|
| AT | 60340 | 7/1913 |
| CA | 32918 | 11/1889 |
| DE | 39 38 356 | 5/1995 |
| DE | 102 10 426 | 10/2003 |
| DE | 10 2009 004 816 | 7/2010 |
| EP | 1 386 076 | 7/2009 |
| EP | 2 868 912 | 5/2015 |

OTHER PUBLICATIONS

English machine translation of De 10210426A1, Aug. 18, 2025.*
Int'l Search Report (SR) (Form PCT/ISA/210) & Written Opinion (WO) (Form PCT/ISA/237) conducted in Int'l Appln. No. PCT/AT2023/060078 (Jun. 5, 2023).
Int'l Prelim. Exam Report (IPER) (Form PCT/IPEA/409) conducted in Int'l Appln. No. PCT/AT2023/060078 (May 16, 2024).

* cited by examiner

*Primary Examiner* — Christopher Verdier
(74) *Attorney, Agent, or Firm* — GREENBLUM & BERNSTEIN, P.L.C.

(57) ABSTRACT

A bucket of a Pelton turbine with an outlet edge curved at least in segments. To achieve a particularly high efficiency the outlet edge forms a rear hump in a side view, wherein a center of curvature of the hump is positioned below the outlet edge in the side view and a peak of the hump is located closer to the cup base than to the bucket face.

9 Claims, 5 Drawing Sheets

BUCKET OF A PELTON TURBINE

The invention relates to a bucket of a Pelton turbine with an outlet edge curved at least in segments.

Pelton turbines have long been part of the prior art and are known in particular from the document CA 32918 A. Whereas initially only buckets with flat outlet edges were used, as described in the document DE 39 38 356 C2 for example, Pelton turbine buckets with curved outlet edges have also been known for some time, in particular from the documents EP 1 386 076 B1 and EP 2 868 912 A1. The objective thereby has always been an improvement in efficiency through a beneficial influence on flow produced by the bucket shape.

Accordingly, it is also the object of this invention to specify a Pelton bucket of the type named at the outset with which a particular high efficiency can be achieved.

According to the invention, this object is attained by a bucket of the type named at the outset in which the outlet edge forms a rear hump in a side view, wherein a center of curvature of the hump is positioned below the outlet edge in a side view and a peak of the hump is located closer to the cup base than to the bucket face.

In the course of the invention, it was found that, in this manner, an outlet height of the water jet can be increased, whereby a better control of the exiting flow is achieved, which in turn results in an increase in the efficiency.

The embodiment according to the invention enables the design of innovative bucket profiles with more geometry possibilities in terms of positions, curvatures, and angles in order to:

- optimize the energy transfer to the runner for a better hydraulic efficiency;
- optimize the reverse flow of water from the cup, in order to reduce the reverse flow to the nozzles and the runner, and to alter the points of impingement of the water on the nozzles or casing;
- optimize the thickness distribution in the runner to improve the tension level in the runner;
- optimize the mass distribution in the runner to improve the dynamic characteristics of the shaft line.

A radial inner end of the bucket or of the cup when the bucket is arranged on a Pelton wheel is understood as a cup base, and a radial outer end of the cup in an arrangement of the bucket on the Pelton turbine as intended is understood as a bucket face. The rear hump is thus typically arranged in a radial inner half of the bucket and mostly does not protrude past a pitch circle diameter. In particular, a peak of the hump, that is, a point of the hump at which the hump has a maximum distance from a theoretical flat outlet edge, typically lies radially within the pitch circle diameter.

It is beneficial if the hump protrudes past a center splitter. A flat portion of the outlet edge, that is, a region in which the outlet edge in a side view forms an essentially straight connecting line between the bucket face and cup base, can be arranged below the center splitter so that, in a preferred embodiment, the flat edge lies below the center splitter and only the hump protrudes past the center splitter.

It has proven effective that a center of mass of the rear hump is positioned between the cup base and a center between the cup base and bucket face. In this manner, a beneficial flow is achieved both in a radial outer region and in a rear region, or a region of the cup that lies radially further inward. Here, the part of the cup which protrudes past a direct, straight connecting line of the cup base and bucket face is understood as the hump. Consequently, the center of mass of this part, which protrudes past the flat edge, is understood as the center of mass.

In this case, the statements radial inner and radial outer refer, of course, to a cylindrical coordinate system starting from a rotational axis of the Pelton wheel on which the bucket is arranged, or can be arranged, as intended.

It is preferably provided that the rear hump extends from the cup base roughly to a center between the cup base and bucket face.

In principle, the hump, which is part of the outlet edge, can be embodied in the most diverse ways. To achieve beneficial flow conditions, it is preferably provided that the hump comprises a first, concave region having a center of curvature that is positioned above the outlet edge in a side view, a second, convex region having a center of curvature that is positioned below the outlet edge in a side view, and a third, concave region having a center of curvature that is positioned above the outlet edge in a side view. Preferably, the rear hump thus comprises two inflection points and, therebetween, a roughly crest-shaped formation, and the first, concave region and the third, concave region tangentially transition into the adjacent edge of the bucket, which consequently typically corresponds in a side view to a straight connecting line of the cup base and bucket face, or a flat edge.

Normally, it is provided that the rear bump extends approximately to the cup base, but the cup comprises in the region of the cup base an outlet edge having a height corresponding to a flat edge. Here, a flat edge is considered to be a line which, in a side view, forms a straight connection of the cup base and bucket face.

To achieve a particularly beneficial flow and a high efficiency, it is preferably provided that the bucket comprises an additional, front hump that is curved at least in segments, wherein a center of curvature is positioned below the outlet edge in a side view, and wherein a peak of the front hump is arranged closer to the bucket face than to the cup base.

A raising of a height of the flow outlet thus also results in a front, or radial outer, region of the bucket.

The front hump preferably likewise comprises a concave region, an adjoining convex region, and another concave region adjoining the convex region, so that the front hump also preferably comprises two inflection points and, as a rule, is located solely above a theoretical flat edge, or above a straight connecting line from the cup base to the bucket face. The front hump can extend to the bucket face, though it can also be provided that the front hump does not completely extend to the bucket face at a front end, so that a straight or flat region results between a front end of the front hump and the bucket face.

It has proven particularly beneficial if the front hump has a smaller height than the rear hump. For example, the front hump and rear hump can have a height of less than 30% of a maximum cup depth (according to the definition from DE 39 38 356 C2).

The present invention can also be combined with a bucket which comprises an outlet edge having a concave region, as is described in the document EP 1 386 076 B1, for example. In this case, it can be provided that the outlet edge comprises a concave region, in particular between a rear hump and front hump.

Buckets for Pelton turbines are typically arranged symmetrically to a center splitter. Accordingly, it has proven beneficial if humps are symmetrically arranged on both sides of a theoretical center plane of the bucket, which center plane normally contains the center splitters.

It shall be understood that corresponding buckets are normally arranged on a Pelton wheel of a Pelton turbine, wherein the Pelton wheel preferably solely contains buckets embodied according to the invention.

Additional features, advantages, and effects of the invention follow from the exemplary embodiments described below. In the drawings which are thereby referenced:

Figure 1:
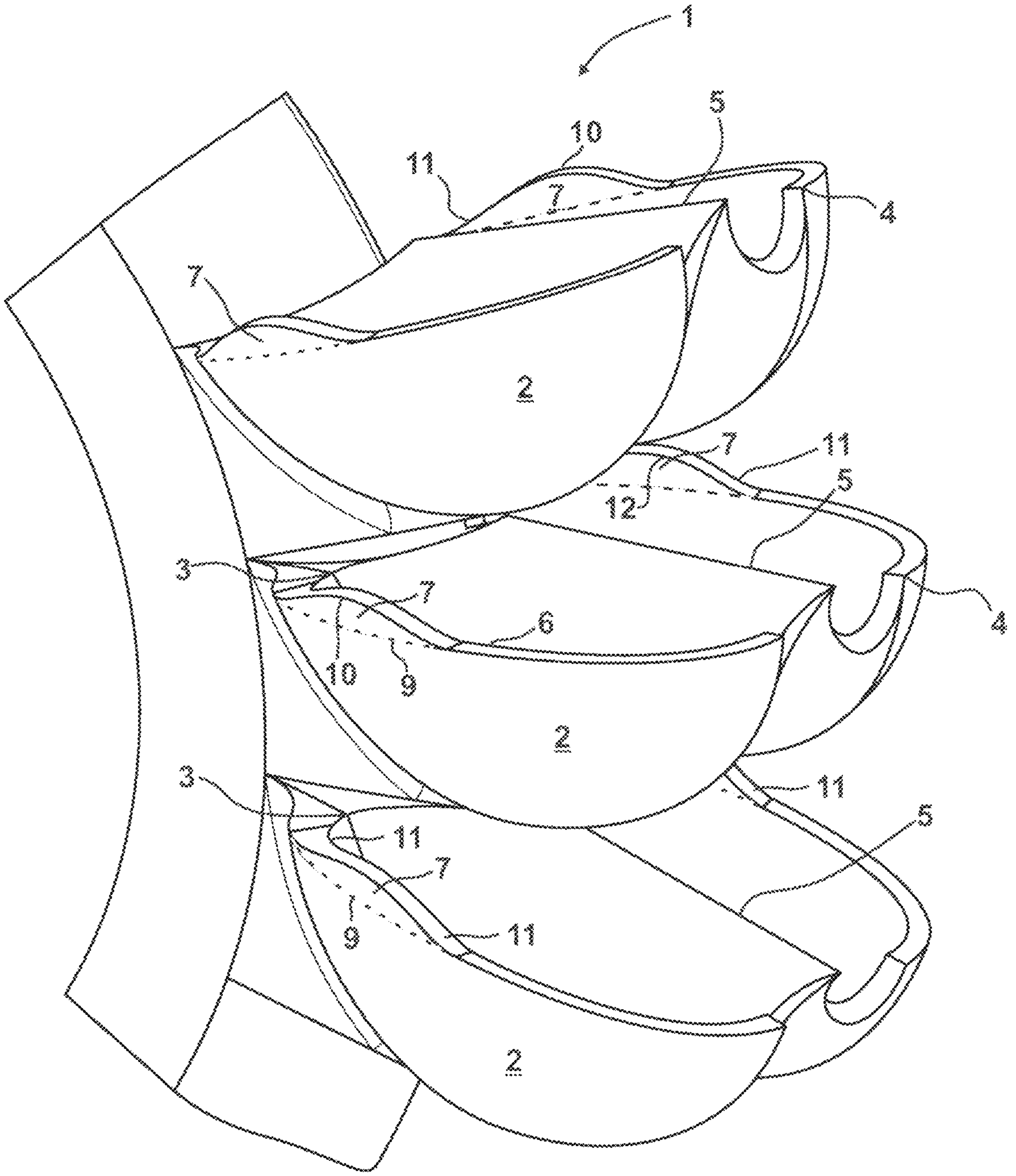
FIG. 1 shows a segment of a Pelton wheel with three buckets embodied according to the invention.

FIG. 1 shows a segment of a Pelton wheel 1 according to the invention, wherein three buckets 2 are depicted. As can be seen, each bucket 2 comprises a bucket face 4, a cup base 3, and a center splitter 5. On both sides of the center splitter 5 and symmetrically to a center plane, the illustrated buckets 2 comprise on outlet edges 6 rear humps 7 which extend past the flat edge 9 illustrated, that is, past a straight connecting line of the cup base 3 and bucket face 4 in a side view. In this manner, an outlet height of the flow is increased in the region of the rear humps 7, which results in flow properties that are more beneficial. In order to make this particularly obvious, the flat edge 9 is illustrated as a dashed line in the region of the rear humps 7. Outside of a region of the rear humps 7, the outlet edge 6 corresponds to the flat edge 9.

As can be seen, the rear humps 7 comprise a first, concave region 11, an adjoining second, convex region 12 that includes a peak 10, and another adjoining concave region 11, wherein the concave regions 11 transition roughly continuously into the flat outlet edge 6. In a side view, the peak 10 of the rear humps 7 is, as can be seen, located closer to the cup base 3 than to the bucket face 4, and thus lies radially inside of a cup center, or within a steel circle.

Figure 2:
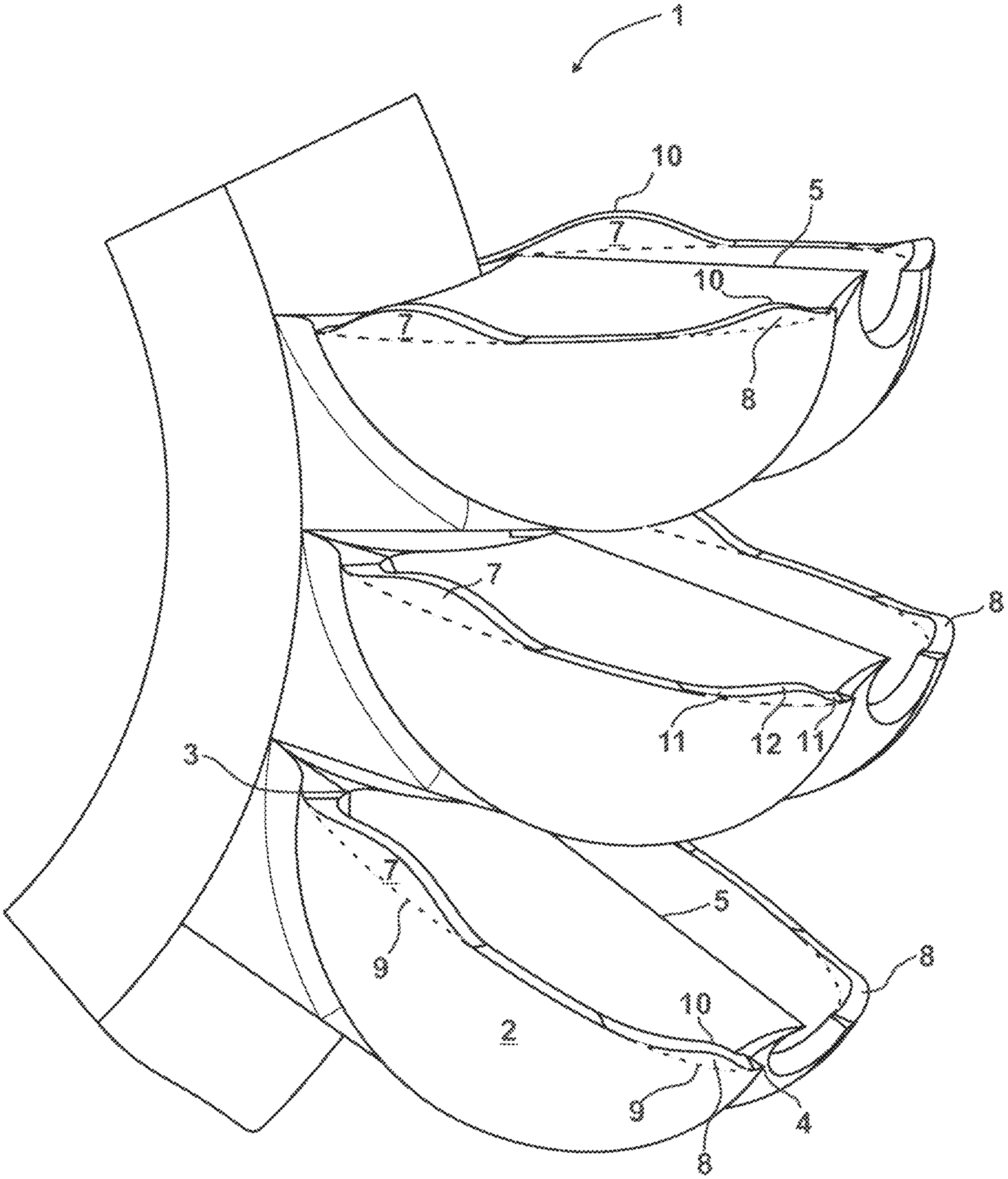
FIG. 2 shows a further segment of a Pelton wheel according to the invention with three buckets embodied according to the invention.

FIG. 2 shows a further exemplary embodiment of a Pelton wheel 1 having buckets 2 embodied according to the invention, wherein a region that comprises three buckets 2 is once again illustrated. In addition to the rear humps 7 illustrated in FIG. 1, these buckets 2 also comprise front humps 8. In this manner, the height of a flow outlet is also raised in regions in the front region. As can be seen, both the rear humps 7 and the front humps 8 in this case each have concave regions 11, an adjoining convex region 12, and another adjoining concave region 11, so that an essentially continuous transition to the outlet edge 6 adjoining the humps results.

It can furthermore be seen that both the front hump 8 and the rear hump 7 do not completely extend to a front and rear end, respectively, of the bucket 2, or to a cup base 3 and a bucket face 4, even though this is possible in principle. Here, the peak 10 of the rear hump 7 is also located closer to the cup base 3 than to the bucket face 4, whereas the peak 10 of the front hump 8 is located closer to the bucket face 4 than to the cup base 3. In the humps illustrated, a center of mass of the rear humps 7 is respectively likewise located closer to the cup base 3 than to the bucket face 4, and a center of mass of the front humps 8 is respectively located closer to the bucket face 4 than to the cup base 3. The centers of mass and peaks 10 of the rear humps 7 thus lie radially within a steel circle not illustrated here, and the peaks 10 and centers of mass of the front humps 8 lie radially outside of the steel circle.

Figure 3:
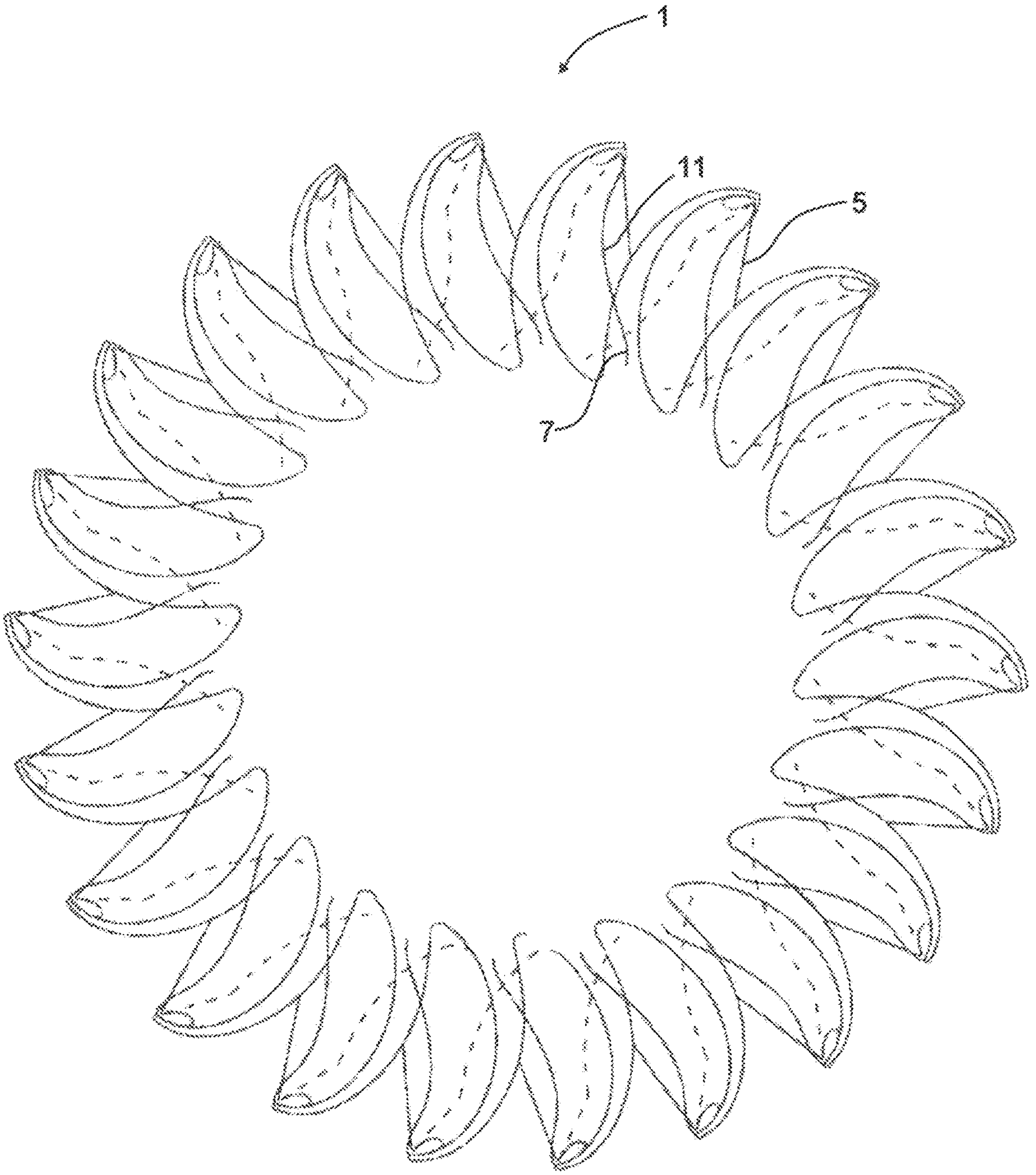
FIG. 3 shows a Pelton wheel.

FIG. 3 shows a further Pelton wheel 1 with buckets 2 embodied according to the invention. As can be seen, the buckets 2 on the one hand comprise a concave region 11 with a curvature, wherein a center of curvature lies above the outlet edge 6 in a side view. Furthermore, these buckets 2 also comprise radial inner rear humps 7 in order to beneficially influence a flow. The outlet edge 6 thereby lies below the center splitter 5 in the concave region 11.

Figure 4:
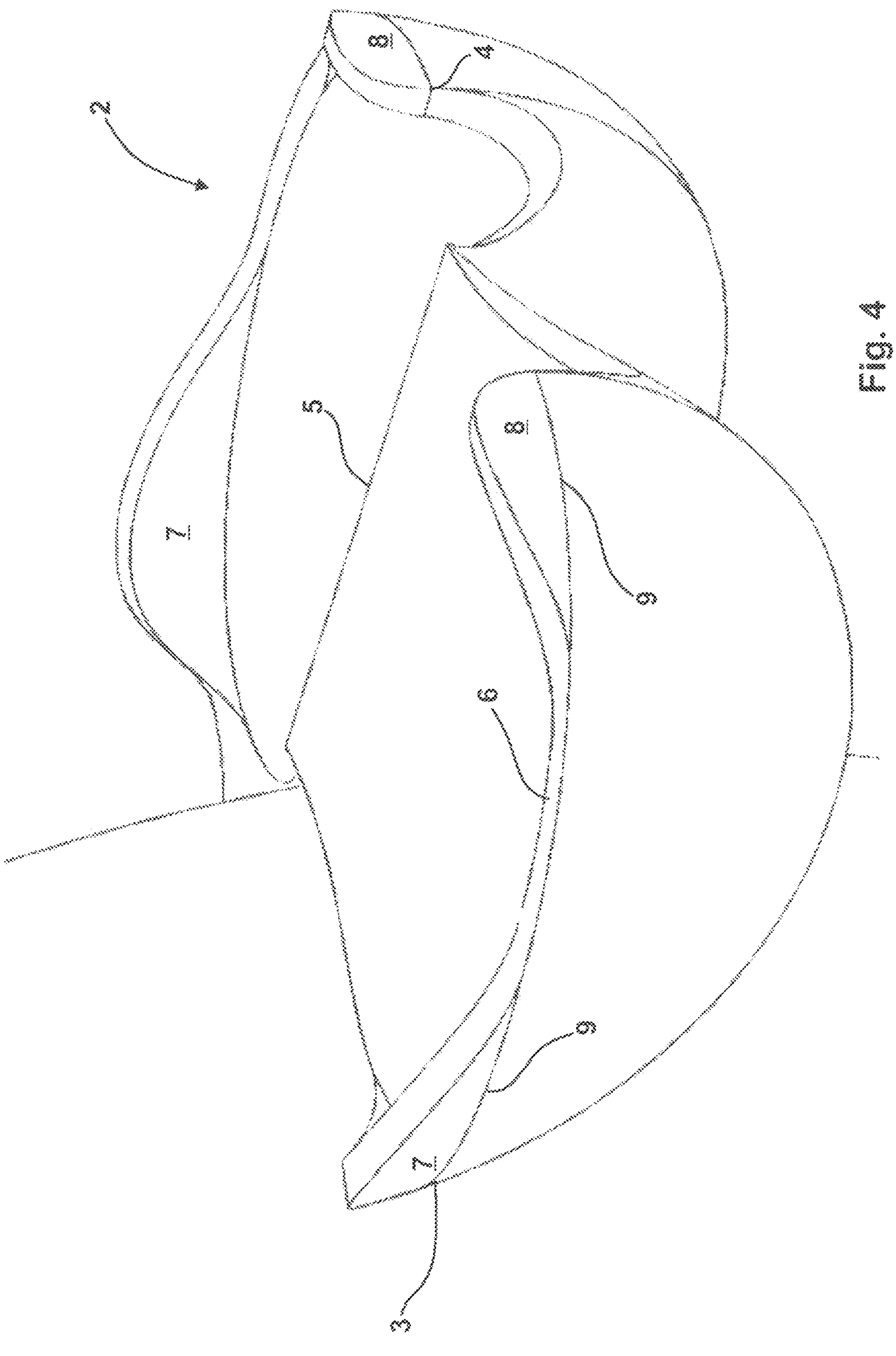
FIG. 4 shows a bucket of a Pelton wheel.

FIG. 4 shows a further bucket 2 of a Pelton turbine that once again comprises rear humps 7 and front humps 8 on both sides of the center splitter 5, which humps respectively rise above a flat edge 9 that coincides with the outlet edge 6 outside of the rear humps 7 and front humps 8. In this case, a connecting line of the bucket face and cup base that is straight in a side view is once again understood as a straight edge. Here, the front humps 8 extend to the bucket face 4 and, in contrast to the front humps 8 illustrated in FIG. 2, comprise at a front end no concave region 11, but rather transition convexly into the bucket face 4. Thus, the front humps 8 in this case only comprise one inflection point, whereas the rear bumps 7 in this case comprise, as in the exemplary embodiment illustrated in FIG. 1, a concave region 11, an adjoining convex region 12, and another concave region 11 adjoining the convex region 12, and thus comprise two inflection points.

Figure 5:
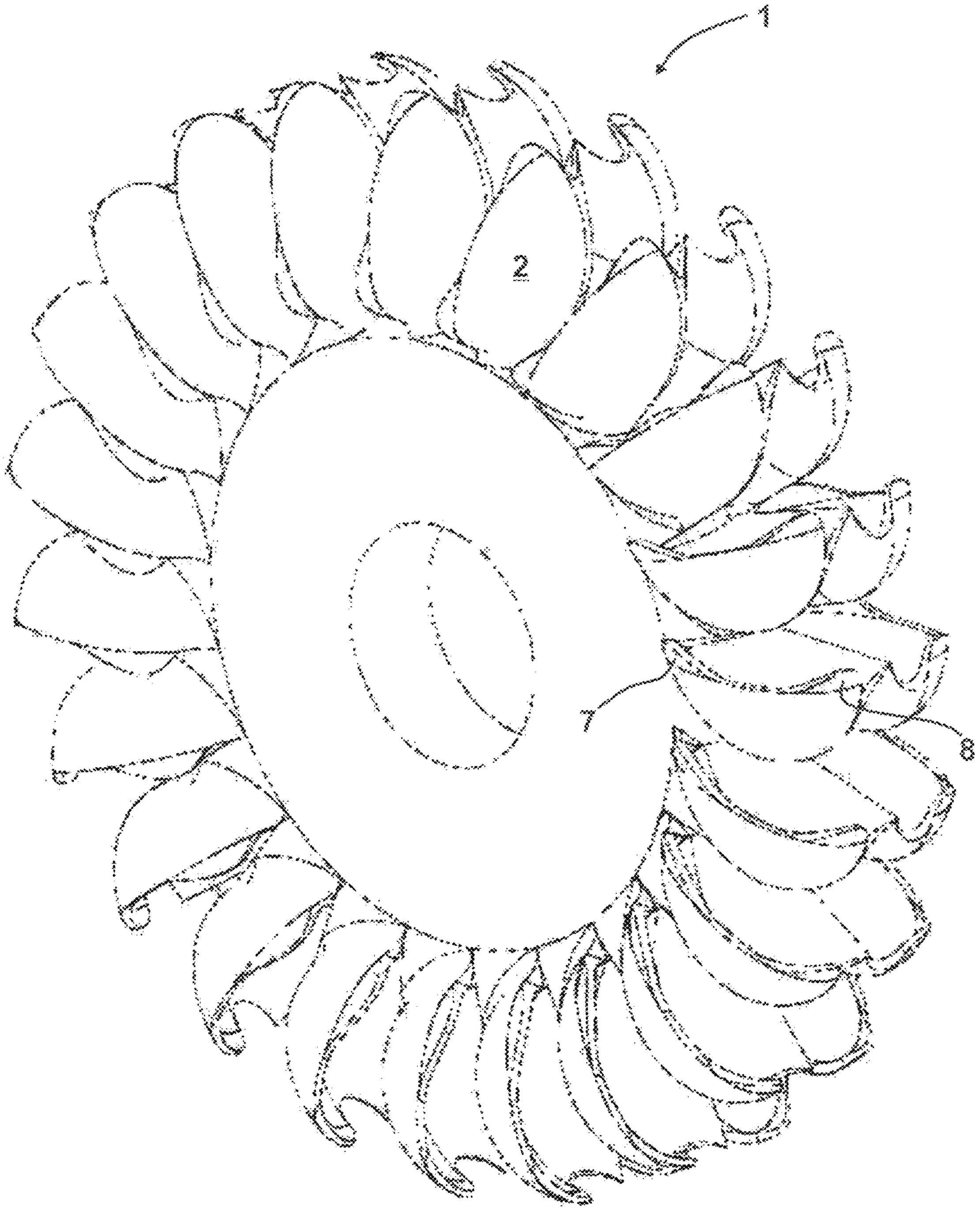
FIG. 5 shows a Pelton wheel.

FIG. 5 shows a Pelton wheel 1 with the buckets 2 illustrated in FIG. 4.

By embodying buckets 2 of a Pelton turbine according to the invention, a beneficial influence on flow can be achieved and an increased efficiency can be obtained. In addition, a previously impossible design of innovative bucket profiles with more geometry possibilities in terms of positions, curvatures, and angles is thus enabled.

The invention claimed is:

1. A bucket of a Pelton turbine with an outlet edge curved at least in segments, wherein the outlet edge forms a rear hump in a side view, wherein a center of curvature of the rear hump is positioned below the outlet edge in the side view and a peak of the rear hump is located closer to a cup base than to a bucket face, wherein the rear hump protrudes past a center splitter to a height above the center splitter.

2. The bucket according to claim 1, wherein the rear hump extends from the cup base roughly to a center between the cup base and bucket face.

3. The bucket according to claim 1, wherein the rear hump comprises a first concave region having a center of curvature that is positioned above the outlet edge in the side view, a second convex region having a center of curvature that is positioned below the outlet edge in the side view, and a third concave region having a center of curvature that is positioned above the outlet edge in the side view.

4. The bucket according to claim 1, wherein the bucket further comprises a front hump that is curved at least in segments, wherein a center of curvature of the front hump is positioned below the outlet edge in the side view, and wherein a peak of the front hump is arranged closer to the bucket face than to the cup base.

5. The bucket according to claim 4, wherein the front hump has a smaller height than the rear hump.

6. The bucket according to claim 4, wherein the outlet edge comprises a concave region between the rear hump and front hump.

7. The bucket according to claim 4, wherein the rear and front humps are symmetrically arranged on both sides of a center plane of the bucket.

8. The bucket according to claim 1, wherein a center of mass of the rear hump is positioned between the cup base and a center between the cup base and the bucket face.

9. A bucket of a Pelton turbine with an outlet edge curved at least in segments, wherein the outlet edge forms a rear hump in a side view, wherein a center of curvature of the rear hump is positioned below the outlet edge in the side view and a peak of the rear hump is located closer to a cup base than to a bucket face, wherein the rear hump protrudes past a center splitter, and wherein the rear hump extends from the cup base roughly to a center point between the cup base and the bucket face.

* * * * *